E. K. BAKER.
DEMOUNTABLE RIM.
APPLICATION FILED AUG. 14, 1916.
1,314,936.
Patented Sept. 2, 1919.
2 SHEETS—SHEET 2.
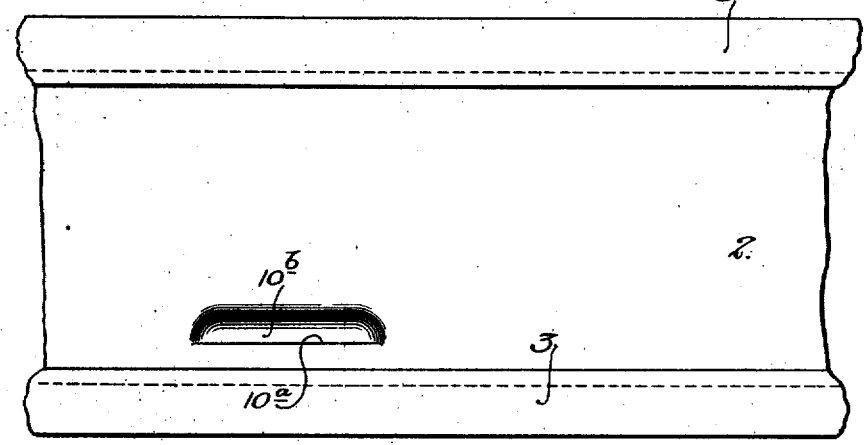
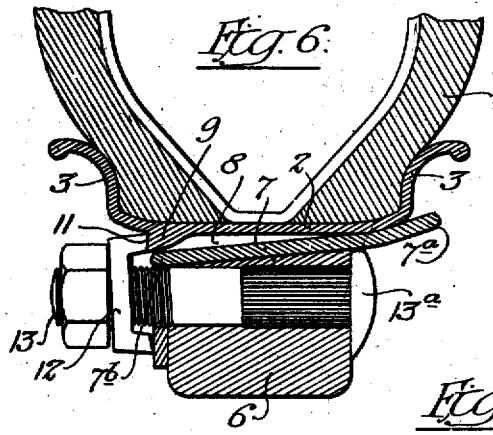
Witness
Inventor:
Erle K. Baker
by
atty.

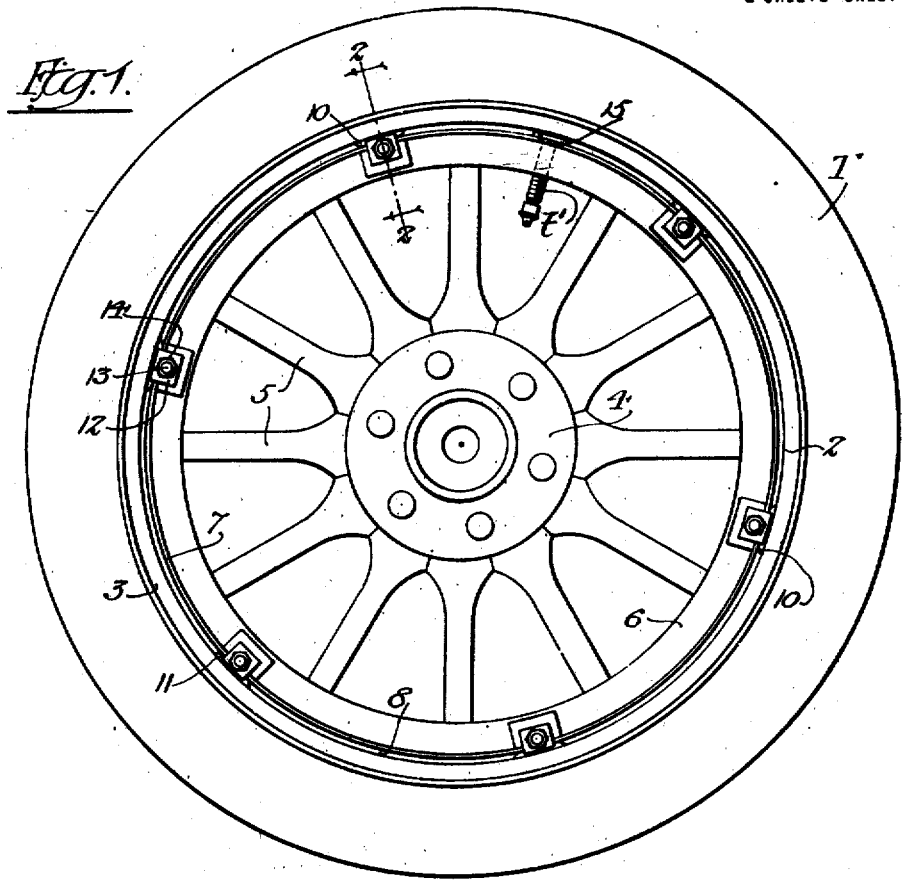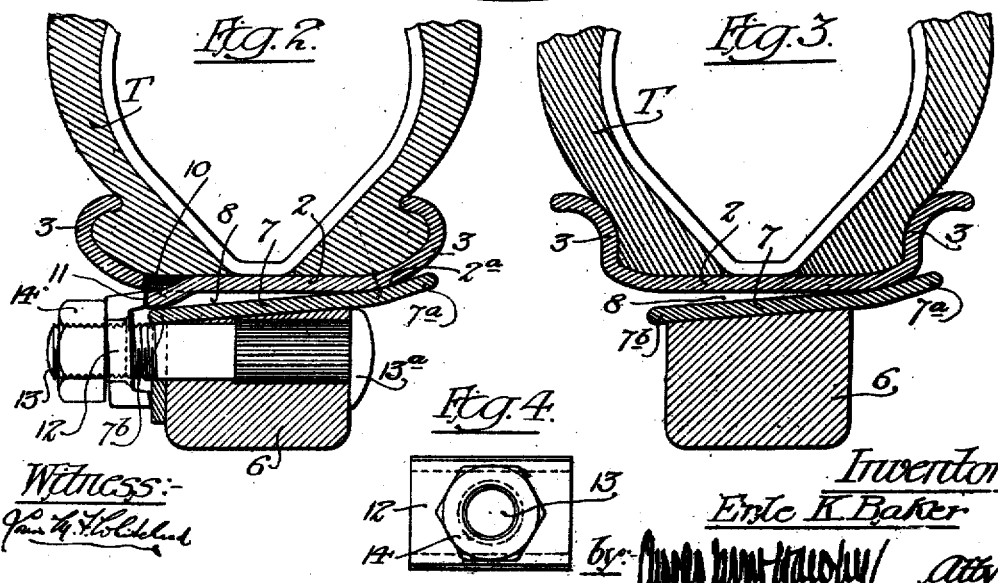

UNITED STATES PATENT OFFICE.

ERLE KING BAKER, OF CHICAGO, ILLINOIS, ASSIGNOR TO UNIVERSAL RIM COMPANY, OF CHICAGO, ILLINOIS, A CORPORATION OF ILLINOIS.

DEMOUNTABLE RIM.

1,314,936.  Specification of Letters Patent.  Patented Sept. 2, 1919.

Application filed August 14, 1916. Serial No. 114,801.

*To all whom it may concern:*

Be it known that I, ERLE KING BAKER, a citizen of the United States, residing at Chicago, Cook county, Illinois, have invented certain new and useful Improvements in Demountable Rims, of which the following is a specification.

My invention relates to demountable rim constructions for motor vehicle wheels which are equipped with tires that require changing from time to time. It is the usual practice to put a pneumatic tire upon a demountable rim, and there inflate it before mounting the rim on the wheel of the motor vehicle. In event the tire is injured or deflated, the rim is demounted, and replaced by another bearing an inflated tire; and the detaching of the injured tire from its rim, as well as the repairing of the tire, may be postponed.

The objects of my invention will be made clear by the following statement of the problems and needs presented by the above defined practice.

The construction of a pneumatic tire is such that it does not lend itself to ready adjustment upon a rim or wheel. Therefore the rim should be made to fit the tire and should be so made that it will be easy to attach and detach the tire; and, the rim must be capable of safely and securely holding the tire, whether in service on the wheel or being carried as an inflated "spare." The rim and wheel construction should be such that it will be easy to both mount and demount the rim with its tire (whether inflated or deflated) and at the same time provide for the secure and dependable holding of the rim and tire against movement on the wheel during service. The true circular form of the tire and rim should be constantly maintained. The tire should be held truly perpendicular to the axis of the wheel. The distortion of either the rim or the tire should be avoided. The concentricity of the tire and rim with respect to the axis of the wheel should be positively insured and constantly maintained. Unless the demounting means responds to the above requirements the structure cannot be pronounced safe or desirable, and if the circularity, concentricity, and perpendicularity of the tire are not maintained, it will be found that the life of the tire is materially shortened. In addition to these requirements, it is essential that the construction shall be of the least weight consistent with the service to be performed, and it is commercially necessary that the costs of manufacture and maintenance shall be low.

For use with standard clencher tires which have base beads that may be stretched over the flanges of the rim, the rim may be of the integrally flanged endless type, and, to that extent, simpler than those required for tires having non-stretchable base beads; To accommodate the latter I may either transplit the rim or provide it with a detachable flange. But in all other respects, the problem remains the same: for the matters of demountability, security, non-distortion, circularity, concentricity and perpendicularity are of equal importance as to all rims and tires.

The specific object of my invention is to provide a demountable rim construction which shall be applicable to rims and tires of all these types, and which shall provide a complete solution of all of the above stated problems.

The present invention is a modification of the forms shown and claimed in U. S. Patent No. 1,183,518. In other words, my present invention comprises a wheel having a single circumferential and conical rim seat formed on its periphery, and a tire carrying rim having a complementary conical seat by which it is circumferentially fitted to said rim seat and is held out of contact with the remainder of the wheel periphery in combination with clamping means adjustable on the outer side of said wheel and pressing axially against said rim to clutch said seats together.

The general nature and principles of my invention, and also the details of the best embodiment thereof that I have thus far devised, will be understood on reference to the drawings which form part of this specification; and are particularly pointed out in the appended claims.

Referring now to said drawings:—Figure 1 is an outer side elevation of a fully equipped motor vehicle wheel embodying my invention;—Fig. 2 is an enlarged section on the line 2—2 of Fig. 1;—Fig. 3 is a similar section but at a point between clamping bolts and showing a straight side rim;—Fig. 4 illustrates one of the washers, clips, or pressure lugs used between the bolts and the demountable rim;—Fig. 5 shows the outer periphery of the demountable rim, as it appears where provided with one of the integral, shouldered projections that coact with the clamping lugs;—Fig. 6 is a sectional view like unto Fig. 2, but showing a demountable rim of hot-rolled section; Fig. 7 is a section of the same at a point between clamping bolts; and Fig. 8 is an inner periphery view of the rim shown in Figs. 6 and 7.

As shown in the drawings, T represents the pneumatic tire;—and, 2 represents the demountable rim on which the tire is held or carried. As made clear by Figs. 2, 3, 6, and 7, the demountable rim in each case is provided with preferably integral flanges, 3—3, and these flanges partake of the form of the tire. If the tire is of clencher cross-section, the rim is likewise of the clencher type; and if the tire is of the straight side type the rim flanges are made to conform therewith. A clencher rim is shown in Fig. 2 and a straight side rim in Fig. 3. I prefer that the demountable rim shall be formed or rolled from cold rolled metal, as indicated in Figs. 2 and 3, but the same may be made from hot rolled section, as shown in Figs. 6 and 7.

In the drawings, 4 represents the wheel hub;—5 the spokes;—6 the felly;—and, 7 the felly band or fixed rim. The wheel differs from others in that the felly band, instead of being of cylindrical form, is of tapered or conical form, and the wheel felly is tapered to fit it. The conical felly band is made up of a body portion substantially co-extensive with the width of the felly, 6, plus an overhanging or back-flange portion, 7ª, which preferably is of greater pitch than the body portion.

The dimensions of the parts are such that when the demountable rim is placed on the fixed rim a space, 8, remains between the two rims; except at the back flange, where the conical surface, 2ª, of the demountable rim rests upon the conical back flange, 7ª. Obviously, this arrangement insures the proper centering of the demountable rim upon the fixed rim and it only remains to provide means which shall bind the demountable rim firmly in that position on the fixed rim.

To that end I provide the demountable rim with either a single peripheral projection, 9, or a plurality of peripheral projections, 10. These projections present abrupt shoulders, 11, against which suitable clamping devices exert their force or thrust, to drive the demountable rim firmly upon the back flange of the fixed rim.

It will be noted that the shoulders, 11, of the projections, 9, and, 10, preferably project beyond the outer edge, 7ᵇ, of the fixed rim. This is the preferred relation, but if desired the shoulder may be positioned inwardly of the edge of the fixed rim.

I find it desirable to so form or proportion the projections, 9, 10, that the same shall not contact the fixed rim, it being essential that the rim shall be permitted to seat itself firmly on the back flange, 7ª. However, as indicated in Fig. 7, the projections of the demountable rim may be made to fit the fixed rim simultaneously with the engagement of the rim with the back flange, 7ª. This construction necessitates the employment of finer or closer methods of manufacture, and, furthermore, is open to the objection that engagement between the projections and the fixed rim is likely to cause the distortion of the demountable rim.

In the preferred form of my invention the projections, 10, are made by shearing short circumferential lengths of the rim upon lines, 10ª, and depressing the portions, 10ᵇ, adjacent the shearing line. In this manner the projections are made integral with the body of the rim, and I find this construction desirable whether the rim is of cold rolled or hot rolled section.

But, as indicated in Figs. 6 and 8, approximately as good results may be secured when the projection, 9, takes the form of a circumferential rib on the inner periphery of the rim and parallels the outer flange thereof. For rims of hot rolled section this rib may be deemed the best form.

As shown in Figs. 1 and 2, I prefer that there shall be six of the integral, shouldered projections, 10, for coaction with pressure lugs or washers, 12, on as many bolts, 13. The latter are equipped with nuts, 14, which press against respective washers, 12. The bolts are provided with heads, 13ª, which bear against the inner side of the felly, 6. They need not engage the fixed rim, 7.

As well known, the pneumatic tire, T, has a valve stem, t', and the felly and fixed rim contain a valve stem hole to admit same. At that point I prefer to provide a driving connection, 15, between the fixed rim and the demountable rim. The office of this connection is to prevent circumferential movement or creeping of the demountable rim on the wheel.

As a preliminary to placing the demountable rim on the wheel, the nuts, 14, and washers, 11, are removed from the bolts, 13. The valve stem, t', is placed in the wheel and the rim is "buttoned" on the wheel in the usual manner, i. e., the demountable rim is swung and seated firmly against or upon the conical back flange, 7ª, of the fixed rim. Whether the projections of the demountable rim be of form 9 or of form 10, they serve to assist the back flange in initially centering the demountable rim on the wheel. The nuts and washers are then replaced and screwed home on the bolts, 13. As shown, the washers or lugs, 11, act against respective projections, 10, and firmly secure the demountable rim.

A wheel constructed in accordance with the foregoing description possesses the advantage of being self-tightening, inasmuch as the bolts constantly draw the tapered felly, 6, into the tapered or conical fixed rim. In this manner the felly and spokes are continuously compressed or contracted within the fixed rim.

A special advantage of the conical fixed rim and self-tightening arrangement, resides in the fact that it is unnecessary to provide a metal-to-metal abutment or engagement between the fixed rim and the heads of the clamping bolts.

That form of my invention which is herein shown and described possesses the advantages of maximum strength, the best possible distribution of material, and minimum cost.

To those who are skilled in the art, it will be apparent that by means of the structure herein disclosed, I accomplish the fulfilment of all the objects and requirements set forth in the opening paragraphs of this specification.

While I have illustrated and described my invention in accordance with the patent statutes, I desire it to be understood that the details of construction may be materially varied and that many changes, modifications and substitutions may be made in the demountable rim construction herein illustrated without departing from the spirit and scope of my invention as set forth in the appended claim.

I claim:—

A demountable rim construction characterized by a wheel having a conical or tapered felly, in combination with a conical or tapered fixed rim of uniform thickness and having thereon a conical back flange, a plurality of bolts extending through the felly, clamping devices thereon, and a demountable rim of generally cylindrical form, the inner side of which is adapted to fit said back flange and the outer side of which presents a plurality of inward projections adapted to coact with said tapered fixed rim and with said clamping devices, substantially as and for the purpose specified.

In testimony whereof, I have hereunto set my hand this 9th day of August, 1916.

ERLE KING BAKER.